(12) United States Patent
Araújo et al.

(10) Patent No.: US 12,316,804 B2
(45) Date of Patent: *May 27, 2025

(54) METHOD FOR AND A COMMUNICATION DEVICE ADAPTED TO MODIFY THE SHAPE OF THE DEVICE

(71) Applicant: Telefonaktiebolaget LM Ericsson (publ), Stockholm (SE)

(72) Inventors: José Araújo, Stockholm (SE); Lars Andersson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 414 days.

This patent is subject to a terminal disclaimer.

(21) Appl. No.: 17/878,386

(22) Filed: Aug. 1, 2022

(65) Prior Publication Data
US 2022/0368794 A1 Nov. 17, 2022

Related U.S. Application Data

(63) Continuation of application No. 17/083,660, filed on Oct. 29, 2020, now Pat. No. 11,438,451, which is a
(Continued)

(51) Int. Cl.
*H04M 1/72454* (2021.01)
*G06F 3/01* (2006.01)
(Continued)

(52) U.S. Cl.
CPC ........ *H04M 1/72454* (2021.01); *G06F 3/016* (2013.01); *G06F 3/0487* (2013.01); *H04M 1/0214* (2013.01); *H04M 1/0268* (2013.01)

(58) Field of Classification Search
CPC ........ G06F 3/016; G06F 3/038; G06F 3/0487; H04M 1/0214; H04M 1/0268; H04M 1/724; H04M 1/72454
See application file for complete search history.

(56) References Cited

U.S. PATENT DOCUMENTS 9,524,030 B2 12/2016 Modarres et al.
10,841,416 B2 11/2020 Araújo et al.
(Continued)

FOREIGN PATENT DOCUMENTS

| CN | 103562827 A | 2/2014 |
| CN | 105144052 A | 12/2015 |

(Continued)

*Primary Examiner* — Nguyen T Vo
(74) *Attorney, Agent, or Firm* — Sage Patent Group

(57) ABSTRACT

A method and a communication device for changing the shape of a flexible communication device is suggested. The suggested method is initiated by recognizing a request for actuating a haptic effect on the communication device. At least one property associated with the requested haptic effect, and at least one property of the communication device, where the latter is being caused by the shape of the communication device, are determined. Based on the mentioned properties, a determination is made on whether conditions, specifying requirements for reproducing the haptic effect on the communication device, are met or not. In case the mentioned conditions are not met, a modification of the shape of the device is determined, such that after such a modification the conditions are met with respect to the mentioned properties.

20 Claims, 5 Drawing Sheets

Related U.S. Application Data continuation of application No. 16/605,593, filed as application No. PCT/EP2017/066033 on Jun. 28, 2017, now Pat. No. 10,841,416.

(51) Int. Cl.
*G06F 3/0487* (2013.01)
*H04M 1/02* (2006.01)

(56) References Cited

U.S. PATENT DOCUMENTS

| | | |
|---|---|---|
| 11,438,451 B2 * | 9/2022 | Araújo et al. ........ H04M 1/724 |
| 2010/0283731 A1 | 11/2010 | Grant et al. |
| 2011/0095975 A1 * | 4/2011 | Hwang ................ G06F 1/1626 |
| | | 345/156 |
| 2013/0265262 A1 * | 10/2013 | Jung .................... G06F 1/1652 |
| | | 345/173 |
| 2015/0195926 A1 | 7/2015 | Kandur Raja et al. |
| 2015/0268724 A1 | 9/2015 | Levesque et al. |
| 2016/0054799 A1 | 2/2016 | Levesque et al. |
| 2016/0147262 A1 * | 5/2016 | Lee ...................... G06F 1/1675 |
| | | 345/173 |
| 2016/0231813 A1 | 8/2016 | Xu |
| 2018/0039302 A1 * | 2/2018 | Levesque ............ H04B 1/3833 |

FOREIGN PATENT DOCUMENTS

| | | |
|---|---|---|
| CN | 105320272 A | 2/2016 |
| CN | 105739612 A | 7/2016 |
| CN | 106125973 A | 11/2016 |
| EP | 2778850 A1 | 9/2014 |
| EP | 2796964 A1 | 10/2014 |

* cited by examiner

METHOD FOR AND A COMMUNICATION DEVICE ADAPTED TO MODIFY THE SHAPE OF THE DEVICE

TECHNICAL FIELD

The present disclosure relates to methods for, and a communication device adapted for, modifying the shape of the device, which is capable of rendering a haptic effect.

BACKGROUND

The haptic or tactile Internet can be seen as a next step towards mobile interworking. While users are currently able to efficiently communicate over voice and video, it is envisioned in the future networked society that people will be able to communicate also the sense of touch via haptic devices. In the past years there has been a large amount of research on devices which allow such communication to take place. Several new haptic devices are being developed, particularly devices that can be worn by a user, such as e.g. gloves, vests, but also devices, such as e.g. smartphones and smartwatches have been adapted for being usable as haptic devices. Various haptic actuator technologies, such as e.g. ultrasound, vibrotactile, electrostatic, piezoelectric and other mechanical solutions are also available.

Haptic perception comprises kinaesthetic and tactile sense and can relate to sensations, including e.g. size, shape, mass, texture and stiffness of physical objects and surfaces. Kinaesthetic information can refer to the information perceived e.g. when moving joints, muscles and/or tendons, while tactile information may e.g. refer to information retrieved via the skin of a human.

Several solutions for handheld devices consider the interaction with a user interface, or they provide haptic effect, or feedback, with respect to an image which is being displayed in the touchscreen of a device. In other use cases, two users, using a respective haptic device, may transmit the sense of touch between each other by interacting with the display of the respective haptic device in real-time. Each user will be able to receive haptic feedback with respect to haptic properties, such as e.g. texture, friction or stiffness, of e.g. a user interface, image, object, or the other user's finger on a specific location, if the device is capable of tracking the user's finger position. By resorting to vibrations and piezoelectric technology, a touchscreen of a device may be able to generate various friction and texture effects.

It is envisioned that future user interaction technologies, such as e.g. touchscreens and wearables will provide users with additional and improved haptic effect. Also, flexible devices and wearables are seen as becoming ubiquitous in people's lives in the future, where such flexible devices will range from textiles and clothing to smartwatches, as well as handheld devices, including smartphones and tablets.

However, possibilities provided from flexible communication devices may cause problems when it is time to render haptic effect on a flexible communication device, since the present shape of the communication device may not be suitable for rendering the haptic effect.

SUMMARY

It is an object of the present document to address, or at least alleviate, at least some of the problems described above.

According to one aspect, a method for changing the shape of a flexible communication device is suggested. The suggested method is recognizing a request for actuating a haptic effect on the communication device, after which a determination of at least one property, associated with the requested haptic effect, as well as a determination of at least one property of the communication device is initiated, where the at least one property of the communication device is caused by the shape of the communication device. Based on the mentioned properties, a determination on whether predefined conditions, specifying requirements for reproducing the haptic effect on the communication device, are met or not, is initiated, and, in case the mentioned conditions are found not to be met, a modification of the shape of the device, such that the mentioned conditions are met with respect to the mentioned properties, is determined.

Once a required change of shape has been determined, the haptic effect can be rendered, or the result of the determination can be stored for later retrieval and rendering. By applying the suggested method, a communication device which is not suitable for rendering haptic effect, due to its present shape, can be automatically adapted, so that rendering can be executed in a desired manner and with a desired quality.

The at least one property associated with the requested haptic effect may be indicative of one or more of amplitude, frequency, duration, or signal envelope, while the at least one property of the communication device may be indicative of one or more of pressure actuated on the communication device, determined self-contact between surfaces of the communication device, current shape of the communication device, or current 3D pose of at least one of the parts of the communication device.

According to one embodiment, the property of the communication device is associated with a specific area of the communication device. Thereby only specific areas of the device need to be considered for change of shape.

The conditions are typically specified by considering a first threshold value with respect to the at least one property associated with the requested haptic effect and a second threshold value with respect to the at least one property associated with the communication device.

Typically, conditions are stored at a storage, accessible to the communication device, but according to an alternative embodiment, conditions are instead provided to the communication device together with the haptic effect.

The determining of the modification may be based on a number of different criteria, such as e.g. one or more of: exceeding the distance between two surfaces of the communication device, minimizing the amount of energy required for the modification, minimizing the modification perceived by the user, or placing the shape of the communication device into a predefined default shape.

Rather than considering the whole area of a communication device where a haptic effect can be rendered, the determining of the modification may instead be applied only on one or more selected areas of the communication device.

The determining of the execution of the determined modification may, instead of directly performing determined modifications, comprise instructing a user of the communication device how to modify the shape of the communication device, where such instructions may e.g. comprise at least one of audiovisual and haptic based instructions.

According to another aspect, a computer program, comprising executable instructions, for causing a communication device to execute a method, such as the one described above, is also suggested.

According to yet another aspect a computer program product, comprising a computer readable storage medium, where the computer readable storage medium comprises the computer program as suggested above, is also suggested According to yet another aspect, a flexible communication device, capable of changing its shape in a controlled way, is suggested, where the communication device comprise a processing circuitry and a memory, wherein the processing circuitry is configured to: recognize a request for actuating a haptic effect on the communication device; initiate determination of at least one property associated with the requested haptic effect; initiate determination of at least one property of the communication device, where the at least one property of the communication device is caused by the shape of the communication device; initiating, a determination on whether conditions, specifying requirements for reproducing the haptic effect on the communication device, are met or not, based on the mentioned properties, and initiating, determination of a modification of the shape of the device, such that the mentioned conditions are met with respect to the mentioned properties, in case the mentioned conditions are initially found not to be met.

According to another aspect, a flexible communication device, capable of changing its shape in a controlled way, is suggested, where the communication device comprise a recognizing unit for recognizing a request for actuating a haptic effect on the communication device; a first determining unit for initiating determination of at least one property associated with the requested haptic effect; a second determining unit for initiating determination of at least one property of the communication device, wherein the at least one property of the communication device is being caused by the shape of the communication device; a third determining unit for initiating a determination on whether conditions, specifying requirements for reproducing the haptic effect on the communication device, are met or not, based on the mentioned properties, and a fourth determining unit for initiating determination of a modification of the shape of the device, such that the conditions are met with respect to said properties, in case said conditions are initially found not to be met.

Furthermore, the suggested communication device is configured so that the method steps execute above can be performed.

BRIEF DESCRIPTION OF DRAWINGS

Embodiments will now be described in more detail in relation to the accompanying drawings, in which.

DETAILED DESCRIPTION

Figure 1A:
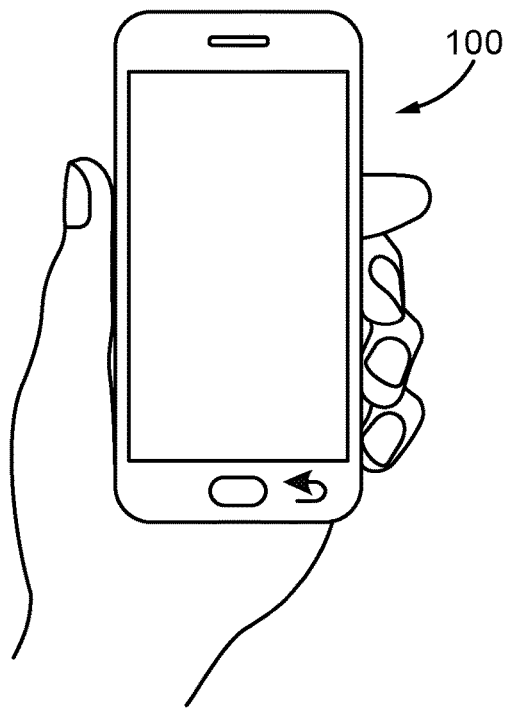
FIG. 1a is an illustration of a handheld flexible communication device, having the shape of a conventional smart phone.

Briefly described, methods for, and a communication device capable of actuating a haptic effect and of changing the shape of the device so that the haptic effect can be actuated, rendered, or reconstructed on the device whenever required, is suggested. More specifically, if a flexible communication device is folded or bent at the time when a haptic effect is to be actuated on the device, the deformation of the device may exceed the limit where e.g. the rendering of the full haptic effect, typically executable by reproducing a vibration, will not be possible, or the vibration frequency and amplitude will be severely deteriorated, thereby resulting in a bad user experience, with respect to the haptic effect. Indeed, due to a self-contact a resonance effect may occur, where the self-contact may induce the communication device to have a higher amplitude than desired at specific frequencies. A flexible communication device may comprise one single flexible body or be constructed as a plurality of flexible bodies, altogether being construed, and acting as one, single flexible body by a user. In order to enable rendering of a haptic effect, the communication device described herein also comprises haptic actuators, distributed over at least parts of the display of the device.

By way of example, a communication device comprising at least one flexible body, comprising one or more vibration motors, may, if folded together to form self-contact e.g. between its end points, not be able to actuate one or more vibration motors, or another type of actuators, in the desired manner, so that a haptic effect can be rendered in a satisfactory manner, since the self-contact may disturb the vibration output from the respective actuators. Therefore, a modification which is sufficient for removing the mentioned disturbing factor on a desired area of the display of the communication device needs to be executed before the actual rendering is executed, and/or data indicative on a determined modification of the communication device is stored.

In order to remedy the problem mentioned above, a method is suggested where it is determined, based on certain properties of a haptic effect to be rendered on a communication device, as well as on certain properties of the communication device, which are important for the actual rendering, that certain conditions for rendering the haptic effect on the communication device are not met. Once it has been determined that conditions for rendering the haptic effect are not met, modifications of the communication device are determined and can be executed and/or stored.

By communication device, which is specifically referred to as a flexible communication device in this document, we hereby mean any type of device, capable of establishing communication via a wireless or wireline communication system, and which is capable of rendering a haptic effect, i.e. reproducing a signal, representing one or more haptic properties, such as e.g. texture friction, stiffness, force, vibration and/or motion. Such a communication device may include a smart telephone, a pad, a wearable, such as e.g. a watch, a bracelet, clothing a head-mounted device, or any type of communication device, comprising a user interface and which is capable of communicating with another device or entity and of changing its shape in a controlled way as describe herein. By changing its shape in a controlled way, we here include self-translation and/or rotation of one or more specific areas of the communication device, or by being caused to change its shape by the user, or any other external agent actuating on the body of the communication device, e.g. according to instructions given to the user of the communication device. More specifically, motors, or other types of actuators of the communication device are capable of causing at least a part of the communication device to rotate and/or translate with respect to its initial pose, defined by a certain position and orientation.

Figure 1B:
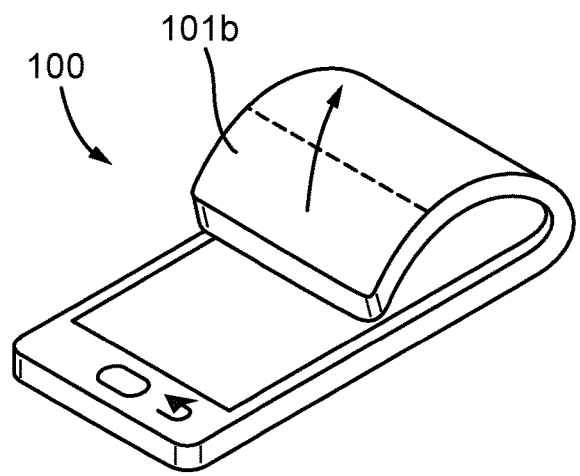
FIGS. 1b-d are illustrations of a flexible communication device in profile which has been folded in various, alternative ways.
Figure 1C:
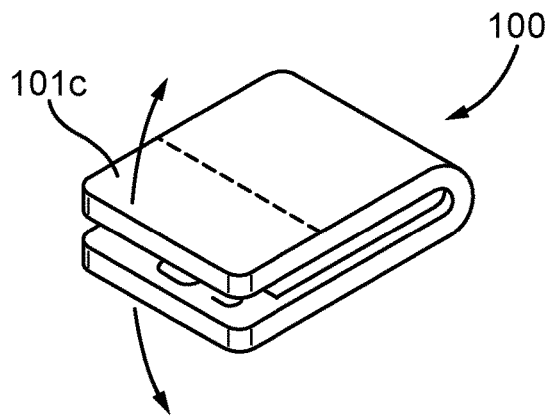
Figure 1D:
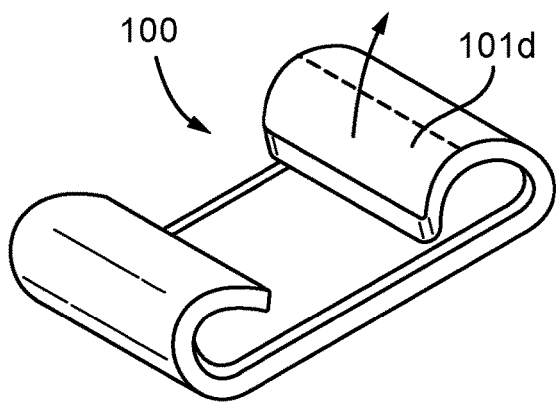

FIG. 1a is illustrating a flexible communication device 100, here in the form of a smart phone, when used as a conventional smart phone, i.e. without exposing it to any deformation of its conventional form. FIG. 1b is another illustration, where the upper part of the phone 100 has been partly folded over the remaining phone body, resulting in self-contact, or almost self-contact. In FIG. 1d, a specific area or region 101b, is representing a typical area for determining relevant properties and for considering modification of the shape in the direction indicated by the arrow. FIG. 1c, is showing the same phone 100 as above, but now folded flat together. Also in this figure, a specific area 101c, to consider for modification of the shape is shown. Alternatively, a larger area may be considered more appropriate in the latter scenario. In another FIG. 1d, both ends of the phone 100 have been folded together, similar to the scenario of FIG. 1a. In case a part of the display of the phone 100 is considered sufficient for rendering a haptic effect, it may be sufficient to modify the shape of the area, indicated by 101d in the Figure. Although not shown in any of the figures, areas for considering properties and modification of the shape may be limited to smaller or bigger areas, such that e.g. any of areas 101a, 101b, 101c or 101d are divided into even smaller areas, where one or more of those are considered for potential modification of the shape. By way of example, area 101c of FIG. 1c may be divided into two areas, where only one of these areas are considered, thereby enabling only one side of the phone 100 to be modified, e.g. by bending it to either side of the phone 100, while the other side is maintained unchanged. It is also to be understood that the body of the phone 100 may be divided into a plurality of areas, where the same or different criteria is applied on different areas in a controlled manner.

Figure 2A:
FIGS. 2a-b are illustrations of a flexible communication device according to FIG. 1b when shown from the side.
Figure 2B:

FIG. 2a is illustrating the flexible phone 100 illustrated in FIG. 1a, when seen from the side. As illustrated in FIG. 1a, the phone 100 is exposed to self-contact, which will require certain actions for avoiding a self-contact, when modifying the shape of the phone 100. FIG. 2b is showing another scenario, where no part of the phone 100 is in contact with another part, i.e. this is typically a less critical scenario with respect to rendering haptic effect, but which still may require some kind of modification of the shape of the phone 100 for enabling rendering of a haptic effect at a certain level of quality/user experience.

A method to be executed in a communication device as described herein, will now be described in further detail, with reference to FIG. 3. In a first step 3:1 of FIG. 3, the communication device is recognizing a request for actuating, reconstructing or rendering a haptic effect on the communication device, i.e. a message, or notification, is recognized at the communication device, which indicates that a message comprising a haptic effect is available for rendering at the communication device, or that rendering of the haptic effect has already started. Typically, however, the user of the communication device is made aware of that the received message contains a haptic effect, and that a modification of the shape of the device is required before rendering is initiated, or noticed by the user.

Even if a user may be able to adapt the shape of the device manually, such an adaptation is not always possible or efficient enough. It can also be difficult, if not impossible, for the user to determine how to adapt the shape e.g. if a minimal adaptation of the shape is preferred. In order for the communication device to automatically be able to adapt sufficiently, the suggested method is therefore commenced by determining properties which relates to the mentioned haptic effect and which will, or may, have impact on modification requirements. Alternatively, in case of a need for modification of the shape due to non-optimal circumstances, the user could be provided with a question on the user interface of the communication device on whether modification is required or not, wherein, in case no modification is required, the rendering of the haptic effect will be executed with the mentioned drawbacks in mind. In the latter case, determination of required modifications could be executed in the background, but without actually executing the resulting modification. Data on the determined modification requirements may instead be stored together with information on the present shape of the communication device and form basis for decisions and optimizations of future modifications.

More specifically, in a next step 3:2, at least one property, associated with the requested haptic effect, is determined. Such a property may e.g. be the amplitude, frequency, duration, or the signal envelope of the haptic effect, or any other property that is considered to be relevant when determining if the haptic effect can be rendered on the communication device at all or with a required quality, if maintained at its present shape. Determination of the selected properties may be executed continuously, periodically or non-periodically, and either a single measurement of such properties is performed, or such properties are measured for a given time duration. By way of example, measurements may be executed e.g. every 50 ms, each time with a duration of e.g. 5 ms, at a sample rate of 1 ms. Properties of the haptic effect may be determined e.g. by applying one or more motion sensors or inertial measurement units, such as e.g. accelerometers gyroscopes, pressure, torque, flex, bent or force sensors, or any other sensors which can measure haptic properties, integrated into the communication device. When determining properties, as suggested above, this may include a property which is indicative of one or more of pressure actuated on the communication device, determined self-contact between surfaces of the communication device, current shape of the communication device, or current 3D pose of at least one of the parts of the communication device. In another step 3:3, which alternatively can be executed prior to, or parallel to step 3:2, one or more properties of the communication device, which is/are considered to be of relevance when rendering the haptic effect on the communication device, is/are determined, accordingly. More specifically, the mentioned determination can be obtained by activating specific sensors of the communication device, which can be referred to as shape sensitive properties of the communication device, to sense one or more properties. The latter category of properties may include e.g. pressure, which may be either self-pressure, i.e. pressure caused by actuators of the communication device, pressure caused by a user, e.g. when manually pressing parts of the communication device together, or a combination thereof. Another property which may be of relevance is a determined self-contact between surfaces of the communication device, which may be determined e.g. by sensing electrical resistance or conductivity of the surface of the communication device or by analysing the current shape of the device to infer how close each non-adjacent section of the device is from each other. Yet another property of relevance may be the current shape of the communication device. In the latter case, the shape can e.g. be determined based on determined pressure on the device, measured distance between surfaces of the device or a combination thereof, or extracting the current state (position, angle, etc.) of the joints which connect several device components, or measuring the output from a flex or bend sensor, which typically experiences a resistance variation when flexed, among other shape, position, deflection or bending sensors available in the art. Typically, the mentioned properties are determined for one or more specific areas of the communication device, where such areas can be selected based on preferred locations of a display for rendering the haptic effect, or areas which are capable of, or more suitable for rendering a haptic effect, e.g. in case only some areas of a display of a communication device is provided with such capabilities.

In a next step 3:4, it is determined whether certain conditions for rendering, or reproducing, the mentioned haptic effect on the communication device are met or not. Such a determination is based on the mentioned, already determined properties. More specifically, a rule may specify that a certain property of a haptic effect exceeding a specific threshold value is critical for an upcoming rendering, resulting in a determination of whether a specific property (or properties) of the communication device, which is relevant for rendering whether or not the respective haptic effect exceeds another respective threshold value. By way of example, an amplitude of a haptic effect can be considered as critical, in case of self-contact, or almost self-contact or a specific shape, of a communication device. Determination of such a property may result in considering determination of self-contact areas, and a property, such as e.g. the pressure exposed to one or both of the areas for determining that the conditions for rendering the haptic effect are not met with respect to the considered properties. According to another example, electroactive polymers may cause parts of a communication device to ben inwards or outwards, resulting in a change of shape which results in that certain conditions are not met. Alternatively, a combination of properties may instead be determined for one or both of the mentioned categories of properties. Generally, a model may be applied on the device which maps haptic related input and output as follows: haptic output=model (haptic input, current shape), wherein it is determined if one or more haptic output properties is/are within one or more threshold values, for the current shape.

Depending on the distribution of sensors and/or actuators on the communication device, the accuracy of where on the device conditions for rendering or reproducing the haptic effect are not met, may differ. With a higher number of sensors and actuators, more, smaller areas can be defined as forming a grid of separate areas distributed over the surface of the communication device, and the more detailed modifications or adaptations of the communication device can also be obtained. In the latter case, smaller modifications of the device may be possible, where required modifications may even be of such a limited nature that it is unnoticed by the user, thereby resulting in a minimal disturbance to the user.

In a next step 3:5, a determination of the required modification of the shape is initiated, wherein the modification is determined, such that the conditions are met with respect to the determined properties. When determining how to amend the communication device, simulations, applying the selected criteria over selected areas, typically the same areas as was applied when determining properties of the surface of the communication device, will be applied. The mentioned simulation may be applied according to one or more selected criteria, which may e.g. be based on amendments requiring a minimal amount of energy, a minimal actuation of relevant actuators, selection of a default shape which most likely be sufficient for a complete rendering of a haptic effect. According to an alternative embodiment, rather than automating the modification, instructions, instructing the user on how to modify the communication device may be applied, where such an instruction could be executed by instructing the user audibly, visually or haptically, or as a combination of two or more of the mentioned means of instructing. By applying instructions, the user will physically be able to adapt the shape of the physical device, thereby saving energy of the communication device.

A number of different criteria can be applied when determining how to modify or adapt the shape in the most efficient way, where, depending on selected approach, a modification can be executed either in one single step or iteratively. The latter scenario is expressed with optional step 3:6 in FIG. 3, where modifications can be executed having one threshold value in mind, or where different threshold values are selected dynamically, throughout the iterative process. More specifically, a required modification can e.g. be determined by increasing the distance between two surfaces of the communication device until the distance allows for a sufficient rendering of the considered property or properties of the haptic effect. Alternatively, criteria for obtaining a minimal modification, as perceived by the user, can be applied. The latter can be executed in a number of ways, such as e.g. the selected at least one area to be modified is located the furthest away from the current location of the user's skin, or the modification is such that rotations of areas close to the user's skin are not performed, or the modification is such that the extension/contraction of the user's device holding shape is minimized, or the modification is performed in a region which is outside of the user current gaze focus area. Alternatively, two or more of the mentioned approaches may be applied in combination. According to other criteria, an adaptation requiring a minimal amount of energy is applied. while yet another approach may be to adapt the communication device by placing the shape of the device into a predefined default shape, which is known to be within the range of providing a sufficient user experience of the haptic effect, i.e. where the mentioned conditions are met.

In a final step 3:7, which can be executed once it has been determined, in a satisfactory way, that considered conditions for rendering the haptic effect are met, the determined modification is executed accordingly. The actual modification of the shape of the communication device is out of the scope of this document but can be performed automatically, using known actuators such as e.g. electrical motors, electroactive polymers, shape memory alloys, pneumatic actuators, or even manually, by instructing the user of the communication device on how to modify the device. A modification may e.g. result in actuation on one or both sides of the device, as well as on one, two or more parts of the device which are in close vicinity of each other. According to one embodiment, determined properties may form the basis for a translation vector, constituting the normal to a determined self-contact point or area, which may be used as a basis for actuators when performing the required modifications of the shape of the communication device. Alternatively, the user may have the option of choosing whether to modify the communication device, or not, even if the described procedure comes to the conclusion that a modification is required, i.e. instead of executing a modification, the suggested modification is stored, together with data on the respective haptic effect, for later retrieval. Storing of such a modification option may also be executed in addition to the execution of the determined modification, according to step 3:7, so that the mentioned scenario can later be used during simulations.

Once the communication device has been modified according to the procedure described above, the device is ready for rendering of the haptic effect. Typically, a message indicating to the user that the received message is ready for rendering on the device can be generated and presented to the user on the display of the device. In case the user decides not to render the message, comprising the haptic effect, at this stage, the present shape of the device may be stored, so that, at a later stage, when the user decides to render the message and the haptic effect, this stored information, representing one possible relation between haptic input and shape of the communication device may be considered as one option for modifications. In the latter case, each received haptic effect could be allocated a specific label, where each haptic effect and associated label can also be allocated a preferred shape, which will meet all requirements for rendering the respective haptic effect.

Even though it is said above that steps 3:2-3:5 are executed in the communication device, it is to be understood that one or more of the mentioned steps may alternatively be executed in another device or entity, or even by a cloud based solution, e.g. for the purpose of saving energy and/or resources at the communication device.

In order to be able to apply the method as described above a flexible communication device need to be adapted for enabling controlled modifications of the shape of the device in line with what has been described above. Such a communication device, according to one embodiment, will be described in further detail below with reference to FIG. 4.

Figure 4:
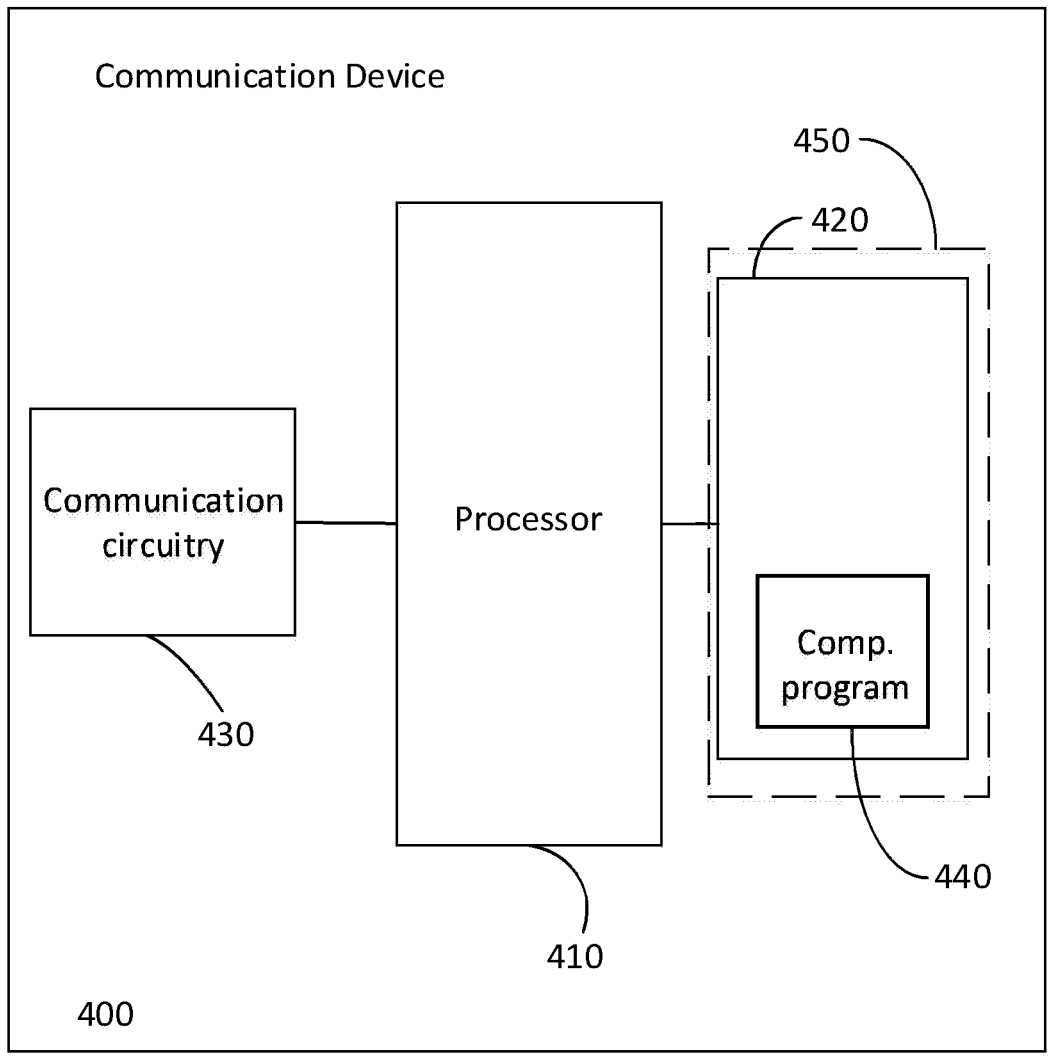
FIG. 4 is an illustration of a flexible communication device according to a first aspect.

FIG. 4 discloses a flexible communication device 400, which is capable of changing its shape in a controlled way. The communication device 400, comprises processing circuitry 410 and a memory 420, where the processing circuitry 410 is configured to perform the steps as mentioned in the method above. Although not shown in the figure, the communication device 400 also comprise a display on which the haptic effect can be reconstructed during rendering, actuators capable of executing the reconstruction on the display, as well as electronic circuitry, capable of modifying the shape of the communication device 400. It is to be understood that while the concept described herein is focusing on how to determine that a modification of a shape of a communication device is required, the means for performing the modification of the shape are out of the scope of this document.

More specifically, the communication device 400 is configured to recognize a request for actuating a haptic effect on the communication device, i.e. a message, requesting the user to actuate the message, which comprise a haptic effect. Once such a request has been recognized by the communication device 400, it is configured to initiate determination of at least one property, associated with the requested haptic effect, i.e. either such a determination is executed by the communication device 400, or initiation of such a determination is triggered at the communication device 400, while the actual determination is executed by another device or entity, to which the trigger is sent from the communication device 400, together with relevant, haptic related data, or data indicative of the haptic effect.

The communication device 400 is also configured to initiate determination of at least one property of the communication device, where this at least one property is caused by the shape of the communication device 400, i.e. due to the present shape of the communication device 400, this respective property is considered relevant for the upcoming rendering of the haptic effect. It is to be understood that the initiation of the determining of the two mentioned categories, may be executed on the other order or in parallel. Once the two categories of properties have been determined, i.e. properties from available properties, which have been considered relevant for rendering of the haptic effect, have been selected, the communication device 400 is configured to initiate a determination on whether conditions, specifying requirements for reproducing the haptic effect on the communication device, are met or not, where such a determination is based on the mentioned properties. In case the mentioned conditions are found not to be met, the communication device 400 is further configured to initiate determination of a modification of the shape of the device 400, such that after the determination, conditions are met with respect to said properties. The latter determination may be executed in one step or iteratively, e.g. depending on the granularity of modification that is required. Once the modification has been executed to satisfaction with respect to the applied conditions, the communication device 400 is capable of initiating execution of the actual determined modification. Alternatively, the outcome of the determination is stored in storage of the communication device 400 for later retrieval, where the storage may form part of memory 420 or be arranged as a separate memory. Each of the initiated determinations mentioned above may either be executed at the communication device 400, or at another device or a remote entity, which the communication device 400 is capable of communicating with via communication circuitry 430, comprising receiving and transmitting circuitry.

The communication device 400 is configured to initiate determination of at least one property associated with the requested haptic effect which may be indicative of e.g. amplitude, frequency, duration, signal envelope, or any other property or parameter, relevant for the rendering of the haptic effect. The flexible communication device 400 may be configured to initiate determination of at least one property of the communication device 400, where that property is indicative of e.g. one or more of pressure actuated on the communication device, determined self-contact between surfaces of the communication device, or current shape of the communication device. The communication device 400 may typically be configured to initiate consideration of at least one property of the communication device when that property is associated with a specific area 101*b*, 101*c*, 101*d*, 101*e* of the communication device 400. Thereby, certain, preferred areas of a display of the device 400 may be considered, while other areas are not.

Conditions or rules, specifying how certain properties of the haptic effect need to relate to certain properties of the communication device 400 in order to obtain an adequate rendering of the haptic effect on the device 400 can be acquired from a memory 420 of the device 400, or from another device or a remote entity, to which the communication device 400 has access, such as e.g. the device from which the haptic effect has been transmitted to the communication device. The communication device 400 is configured to initiate determination on the mentioned conditions or rules which, according to one embodiment, are specified by considering a first threshold value with respect to the at least one property associated with the requested haptic effect and a second threshold value with respect to the at least one property associated with the communication device. According to an alternative embodiment, a plurality of threshold values may instead be considered in a dynamic manner. Alternatively, conditions or rules may be provided to the communication device, together with the haptic effect on which the conditions or rules are to be applied. Thereby, applicable conditions or rules can be initiated by the device or entity which is the initiator of transmission of the haptic effect. The latter embodiment is particularly suitable if the initiator of the transmission is well familiar with the receiving communication device and its properties. According to an alternative embodiment, the mentioned selection of conditions or rules is executed remotely from the transmitting device or entity, e.g. in a cloud related solution.

The communication device 400 may be configured to apply different types of criteria when initiating determination of the modification, where such criteria may comprise e.g. modification until the distance between two surfaces of the communication device 400 is exceeded, minimizing the amount of energy required for the modification, minimizing the modification perceived by the user or placing the shape of the communication device into a predefined default shape. While the former criteria refer to optimization strategies, the latter is a more simple and straight-forward solution. The mentioned selection of criteria is typically executed by applying a model, as suggested above, where one or more criteria is/are simulated, after which the outcome of a preferred criteria is selected when performing the actual modification, or when storing the suggested modification data.

Since the determination of properties can be limited to certain areas of the device 400, the device 400 is also, according to one embodiment, configured to initiate determination of the modification in one or more selected areas of the device 400. In addition to being able to perform automatic modification of the shape of the device 400, the communication device 400 may, according to one alternative embodiment, also be configured to initiate execution of the determined modification by instructing a user of the communication device how to modify the shape of the communication device, where such instructions may comprise one or more of audio, visual and haptic based instructions. Alternatively, automatic and manual modification can be executed in combination, e.g. when the device 400 is running low on battery and thereby need to save energy.

Once a required modification of the shape of a communication device 400 has been determined, the communication device 400 is, according to one embodiment, configured to execute the determined modification, while, according to an alternative embodiment, the communication device 400 is configured to allow the user of the communication device 400 to determine whether modification of the shape of the communication device 400 is required or not. The communication device 400 may further be configured to store the outcome of the determined modification, together with the data decisive for the determination, so that this information can be used as a basis for later determinations on whether to change shape, as well as how to determine how to change the shape. The suggested storage can be applied also when a shape change is executed.

Figure 3:
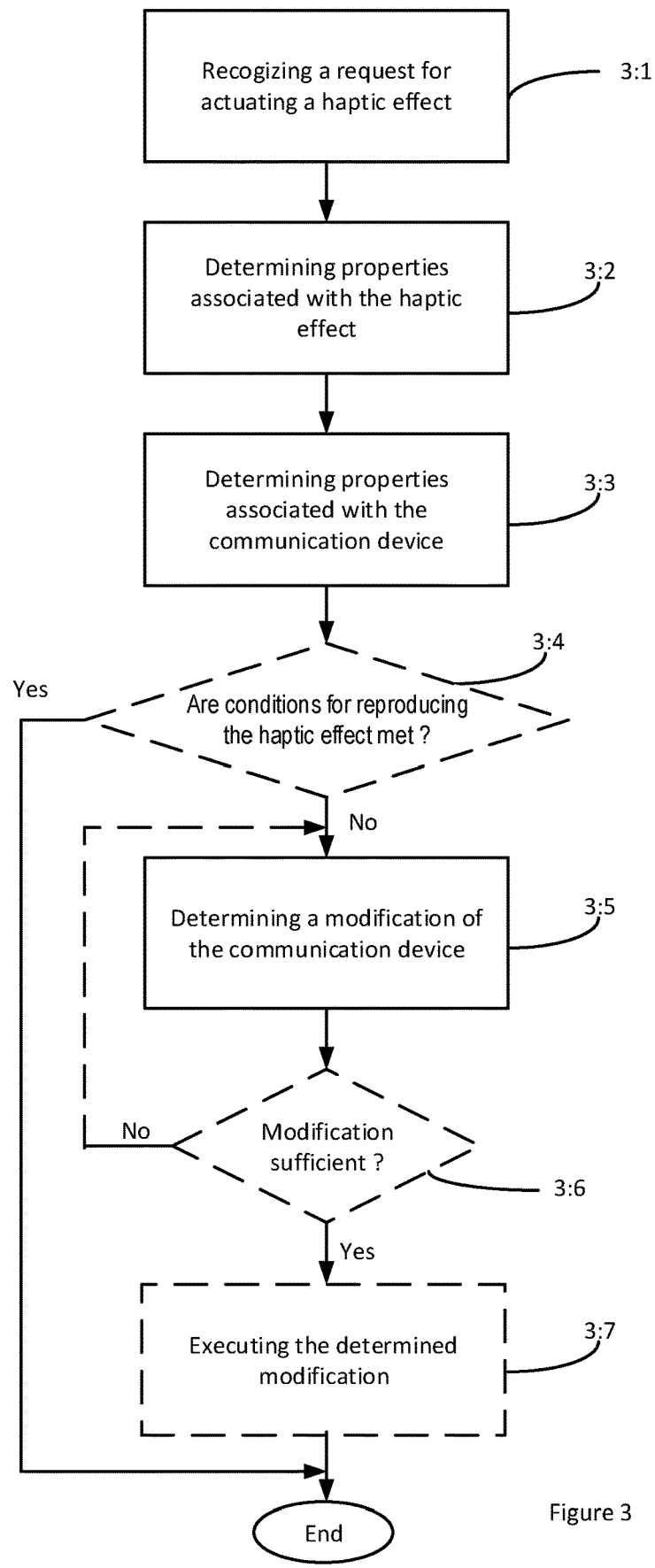
FIG. 3 is a flow chart illustrating a method executable in a flexible communication device.
Figure 5:
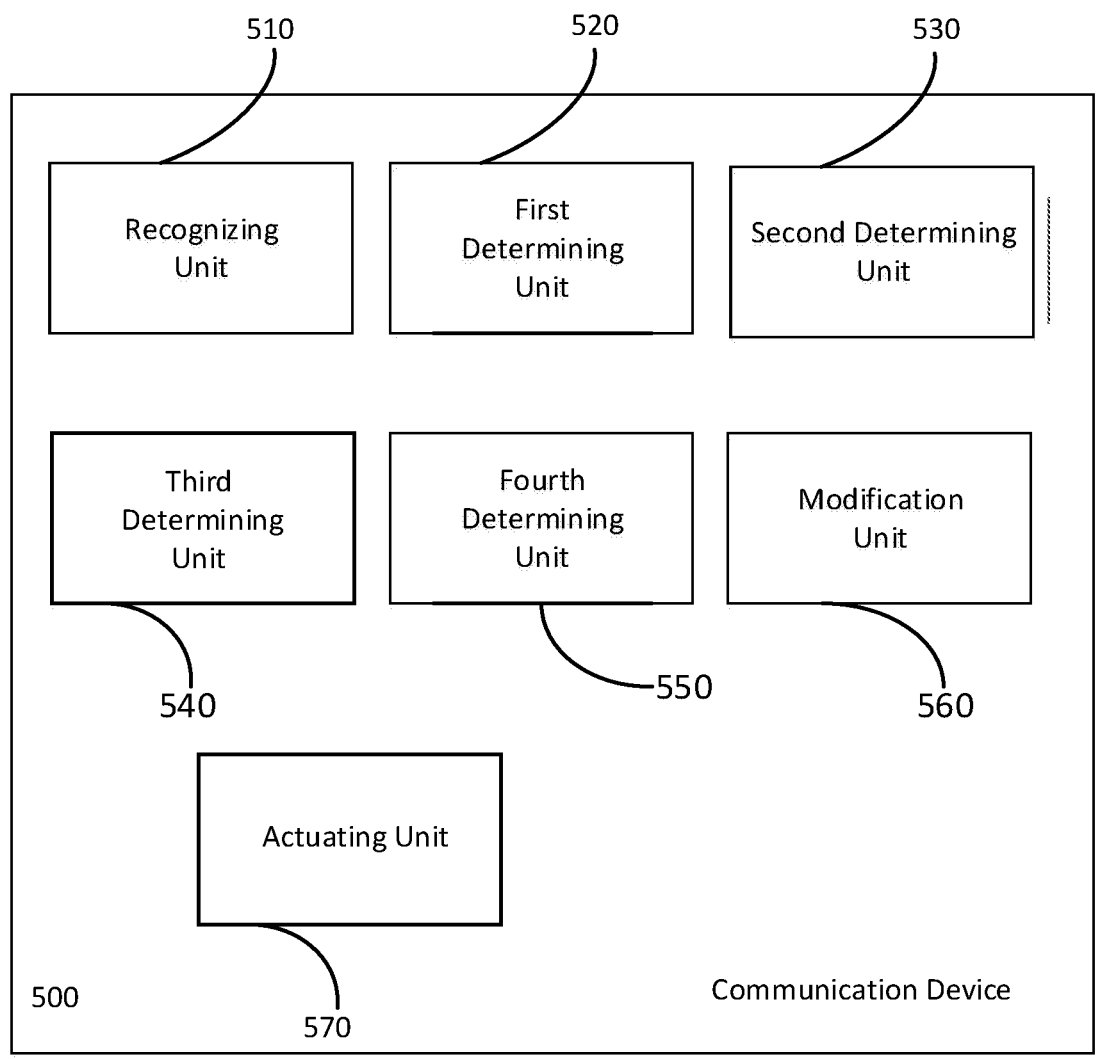
FIG. 5 is an illustration of a flexible communication device according to a second aspect.

A flexible communication device 500 may also be described with reference to FIG. 5, where different functionality of the device 500 is described as a number of functional units, which are configured to interact with each other in such a way that the method according to FIG. 3 is executable. Alternatively, one or more of the units mentioned above can be replaced by modules, each of which is comprising executable instructions for executing corresponding functionality.

More specifically, the communication device 500 comprises a recognizing unit 510 for recognizing a request for actuating a haptic effect on the communication device 500, a first determining unit 520 for initiating determination of at least one property associated with the requested haptic effect, a second determining unit 530 for initiating determination of at least one property of the communication device, where the at least one property of the communication device is caused by the shape of the communication device, a third determining unit 540 for initiating a determination on whether conditions, specifying requirements for reproducing the haptic effect on the communication device, are met or not, where the determining is based on the mentioned properties. The communication device 500 also comprises a fourth determining unit 550 for initiating determination of a modification of the shape of the device 500, such that the mentioned conditions are met with respect to said properties, in case it has been determined that the conditions were initially not met, and a modification unit 560 for executing the determined modification. The communication device 500 also comprise one or more actuating units 570 for actuating the haptic effect whenever required, once a sufficient modification has been executed. Although not illustrated in the figure, the communication device also comprises one or a plurality of memories for data storage It is to be understood that the memory 420 of FIG. 4, as well as memory of communication device 500, may comprise a plurality of separate memories, where e.g. one or more of these memories can be comprised in a computer program product, while others form part of the communication device 400. The data memory can be any combination of read and write memory (RAM) and read only memory (ROM) and may also comprise persistent storage, which, for example, can be any single one or combination of magnetic memory, optical memory, solid state memory or even remotely mounted memory.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a communication device, the method comprising:
    determining that a condition for rendering a haptic effect on the communication device is not met, wherein the condition is required to be met before the haptic effect is rendered on the communication device;
    responsive to determining that the condition is not met, determining a modification of the shape of the communication device that would cause the condition to be met;
    performing the modification of the shape of the communication device such that the condition is met; and
    after the condition is met, rendering the haptic effect on the communication device.

2. The method of claim 1, wherein the communication device comprises one or more vibration motors configured to render the haptic effect on the communication device as a vibration of the communication device.

3. The method of claim 1, wherein the communication device is a flexible communication device that comprises at least one flexible body,
    wherein determining the modification of the shape of the communication device that would cause the condition to be met comprises determining flexing of the at least one flexible body that would cause the condition to be met.

4. The method of claim 1, wherein determining that the condition for rendering the haptic effect on the communication device is not met comprises determining that the condition is met for rendering the haptic effect on the communication device given a current shape of the communication device.

5. The method of claim 1, wherein determining that the condition for rendering the haptic effect on the communication device is not met comprises determining that the condition is not met if one or more of:
pressure on the communication device exceeds a pressure threshold;
a measure of self-contact between surfaces of the communication device exceeds a self-contact threshold; or
an output from a flex or bend sensor exceeds a threshold.

6. The method of claim 1, wherein determining the modification of the shape of the communication device that would cause the condition to be met comprises determining the modification as a function of:
a distance between two surfaces of the communication device,
an amount of energy required for the modification,
a perception of the modification by a user of the communication device, or
a default shape of the communication device.

7. The method of claim 1, wherein the modification of the shape of the communication device comprises modification of on at least one selected area of the communication device.

8. The method of claim 1, wherein performing the modification of the shape of the communication device such that the condition comprises instructing a user of the communication device how to perform the determined modification of the shape of the communication device.

9. The method of claim 1, wherein performing the modification of the shape of the communication device such that the condition comprises controlling one or more actuators of the communication device to perform the modification of the shape of the communication device.

10. A communication device comprising:
processing circuitry; and
memory coupled to the processing circuitry and including instructions stored therein that are executable by the processing circuitry to cause the communication device to perform operations comprising:
determining that a condition for rendering a haptic effect on the communication device is not met, wherein the condition is required to be met before the haptic effect is rendered on the communication device;
responsive to determining that the condition is not met, determining a modification of the shape of the communication device that would cause the condition to be met;
performing the modification of the shape of the communication device such that the condition is met; and
after the condition, rendering the haptic effect on the communication device.

11. The communication device of claim 10, wherein the communication device comprises one or more vibration motors configured to render the haptic effect on the communication device as a vibration of the communication device.

12. The communication device of claim 10, wherein the communication device is a flexible communication device that comprises at least one flexible body,
wherein determining the modification of the shape of the communication device that would cause the condition to be met comprises determining flexing of the at least one flexible body that would cause the condition to be met.

13. The communication device of claim 10, wherein determining that the condition for rendering the haptic effect on the communication device is not met comprises determining that the condition for rendering the haptic effect on the communication device is not met given a current shape of the communication device.

14. The communication device of claim 10, wherein determining that the condition for rendering the haptic effect on the communication device is not met comprises determining that the condition is not met if one or more of:
pressure on the communication device exceeds a pressure threshold;
a measure of self-contact between surfaces of the communication device exceeds a self-contact threshold; or
an output from a flex or bend sensor exceeds a threshold.

15. The communication device of claim 10, wherein determining the modification of the shape of the communication device that would cause the condition to be met comprises determining the modification as a function of:
a distance between two surfaces of the communication device,
an amount of energy required for the modification,
a perception of the modification by a user of the communication device, or
a default shape of the communication device.

16. The communication device of claim 10, wherein the modification of the shape of the communication device comprises modification of on at least one selected area of the communication device.

17. The communication device of claim 10, wherein performing the modification of the shape of the communication device such that the condition is met comprises instructing a user of the communication device how to perform the determined modification of the shape of the communication device.

18. The communication device of claim 10, wherein performing the modification of the shape of the communication device such that the condition is met comprises controlling one or more actuators of the communication device to perform the modification of the shape of the communication device.

19. A non-transitory computer-readable storage medium on which is stored instructions that, when executed by a processor of a communication device, cause the communication device to perform operations comprising:
determining that a condition for rendering a haptic effect on the communication device is not met, wherein the condition is required to be met before the haptic effect is rendered on the communication device;
responsive to determining that the condition is not met, determining a modification of the shape of the communication device that would cause the condition to be met;
performing the modification of the shape of the communication device such that the condition; and
after the condition is met, rendering the haptic effect on the communication device.

20. The non-transitory computer-readable storage medium of claim 19, wherein the communication device is a flexible communication device that comprises at least one flexible body,
wherein determining the modification of the shape of the communication device that would cause the condition to be met comprises determining flexing of the at least one flexible body that would cause the condition to be met.

\* \* \* \* \*